US012683984B2

(12) United States Patent  
Duan et al.

(10) Patent No.: US 12,683,984 B2  
(45) Date of Patent: Jul. 14, 2026

(54) REAL-TIME DETECTION OF DNS INFILTRATION TRAFFIC

(71) Applicant: Palo Alto Networks, Inc., Santa Clara, CA (US)

(72) Inventors: Ruian Duan, Santa Clara, CA (US); Daiping Liu, Sunnyvale, CA (US); Tingxiang Zhu, Santa Clara, CA (US); Xing Wang, Santa Clara, CA (US); Jun Wang, Fremont, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 59 days.

(21) Appl. No.: 18/217,253

(22) Filed: Jun. 30, 2023

(65) Prior Publication Data

US 2024/0205240 A1 Jun. 20, 2024

Related U.S. Application Data

(60) Provisional application No. 63/432,963, filed on Dec. 15, 2022.

(51) Int. Cl.  
*H04L 9/40* (2022.01)

(52) U.S. Cl.  
CPC ...... *H04L 63/1416* (2013.01); *H04L 63/1425* (2013.01); *H04L 63/1466* (2013.01)

(58) Field of Classification Search  
CPC ............ H04L 63/1416; H04L 63/1425; H04L 63/1466  
See application file for complete search history.

(56) References Cited

U.S. PATENT DOCUMENTS

| | | |
|---|---|---|
| 7,467,410 B2 | 12/2008 | Graham |
| 7,934,254 B2 | 4/2011 | Graham |
| 7,958,555 B1 | 6/2011 | Chen |
| 8,141,157 B2 | 3/2012 | Farley |
| 8,260,914 B1 | 9/2012 | Ranjan |
| 8,269,914 B2 | 9/2012 | Huo |
| 8,494,985 B1 | 7/2013 | Keralapura |
| 8,561,177 B1 | 10/2013 | Aziz |
| 8,566,928 B2 | 10/2013 | Dagon |
| 8,631,489 B2 | 1/2014 | Antonakakis |
| 8,826,444 B1 | 9/2014 | Kalle |

(Continued)

FOREIGN PATENT DOCUMENTS

| | | |
|---|---|---|
| CN | 105577660 | 3/2019 |
| WO | 2007050244 | 5/2007 |

OTHER PUBLICATIONS

Qi et al., BotCensor: Detecting DGA-Based Botnet Using Two-Stage Anomaly Detection, 2018 17th IEEE International Conference on Trust, Security and Privacy in Computing and Communications/ 12th IEEE International Conference on Big Data Science and Engineering, pp. 754-762.

(Continued)

*Primary Examiner* — Joe Chacko  
(74) *Attorney, Agent, or Firm* — Van Pelt, Yi & James LLP

(57) ABSTRACT

Real-time detection of DNS infiltration traffic is disclosed. A DNS response associated with a DNS query sent by a client device is received. An attempted DNS infiltration is detected based at least in part on an automated analysis of the DNS response. In response to the detection, a remedial action is performed.

20 Claims, 13 Drawing Sheets

(56) References Cited

U.S. PATENT DOCUMENTS

| | | | |
|---|---|---|---|
| 9,043,894 B1 | 5/2015 | Dennison | |
| 9,178,901 B2 | 11/2015 | Xue | |
| 9,330,258 B1 | 5/2016 | Satish | |
| 9,356,942 B1 | 5/2016 | Joffe | |
| 9,363,282 B1 | 6/2016 | Yu | |
| 9,497,213 B2 | 11/2016 | Thompson | |
| 9,516,039 B1 | 12/2016 | Yen | |
| 9,621,576 B1 | 4/2017 | Oprea | |
| 9,922,190 B2 | 3/2018 | Antonakakis | |
| 10,089,411 B2 | 10/2018 | Kassa | |
| 10,097,568 B2 | 10/2018 | Baughman | |
| 10,270,744 B2 | 4/2019 | Yu | |
| 10,362,057 B1 * | 7/2019 | Wu | H04L 63/1408 |
| 10,673,880 B1 | 6/2020 | Pratt | |
| 10,679,088 B1 | 6/2020 | Dalal | |
| 10,848,509 B1 | 11/2020 | Mcnab | |
| 10,958,668 B1 | 3/2021 | Wang | |
| 11,153,330 B1 | 10/2021 | Antoniewicz | |
| 11,159,486 B2 | 10/2021 | Pangeni | |
| 2002/0111769 A1 | 8/2002 | Takeuchi | |
| 2004/0073640 A1 | 4/2004 | Martin | |
| 2006/0212925 A1 | 9/2006 | Shull | |
| 2008/0028463 A1 | 1/2008 | Dagon | |
| 2008/0155694 A1 | 6/2008 | Kwon | |
| 2009/0089426 A1 | 4/2009 | Yamasaki | |
| 2010/0192225 A1 | 7/2010 | Ma | |
| 2011/0078794 A1 | 3/2011 | Manni | |
| 2011/0191423 A1 | 8/2011 | Krasser | |
| 2011/0231935 A1 | 9/2011 | Gula | |
| 2011/0283359 A1 | 11/2011 | Prince | |
| 2011/0283361 A1 | 11/2011 | Perdisci | |
| 2011/0302656 A1 | 12/2011 | El-Moussa | |
| 2012/0054860 A1 | 3/2012 | Wyschogrod | |
| 2012/0303808 A1 | 11/2012 | Xie | |
| 2012/0304287 A1 | 11/2012 | Yu | |
| 2013/0080574 A1 | 3/2013 | Prince | |
| 2013/0174253 A1 | 7/2013 | Thomas | |
| 2013/0191915 A1 | 7/2013 | Antonakakis | |
| 2013/0232574 A1 | 9/2013 | Carothers | |
| 2014/0013434 A1 | 1/2014 | Ranum | |
| 2014/0068763 A1 | 3/2014 | Ward | |
| 2014/0068775 A1 | 3/2014 | Ward | |
| 2014/0075558 A1 | 3/2014 | Ward | |
| 2014/0090058 A1 | 3/2014 | Ward | |
| 2014/0143825 A1 | 5/2014 | Behrendt | |
| 2014/0230062 A1 | 8/2014 | Kumaran | |
| 2014/0245436 A1 | 8/2014 | Dagon | |
| 2014/0283063 A1 | 9/2014 | Thompson | |
| 2014/0298460 A1 | 10/2014 | Xue | |
| 2015/0007250 A1 | 1/2015 | Dicato, Jr. | |
| 2015/0007312 A1 | 1/2015 | Pidathala | |
| 2015/0143504 A1 | 5/2015 | Desai | |
| 2015/0188879 A1 | 7/2015 | Cha | |
| 2015/0264070 A1 | 9/2015 | Harlacher | |
| 2015/0281257 A1 | 10/2015 | Hart | |
| 2016/0036848 A1 | 2/2016 | Reddy | |
| 2016/0065611 A1 | 3/2016 | Fakeri-Tabrizi | |
| 2016/0294773 A1 | 10/2016 | Yu | |
| 2016/0352679 A1 | 12/2016 | Hagen | |
| 2016/0352772 A1 | 12/2016 | O'Connor | |
| 2016/0359887 A1 | 12/2016 | Yadav | |
| 2017/0126706 A1 | 5/2017 | Minea | |
| 2017/0195285 A1 | 7/2017 | Kakhki | |
| 2017/0295187 A1 | 10/2017 | Havelka | |
| 2017/0331789 A1 | 11/2017 | Kumar | |
| 2018/0063162 A1 | 3/2018 | Baughman | |
| 2018/0081991 A1 | 3/2018 | Barber | |
| 2018/0115582 A1 | 4/2018 | Thakar | |
| 2018/0124020 A1 | 5/2018 | Rodriguez | |
| 2018/0198821 A1 | 7/2018 | Gopalakrishna | |
| 2018/0278633 A1 | 9/2018 | Brutzkus | |
| 2018/0309795 A1 | 10/2018 | Ithal | |
| 2018/0351972 A1 | 12/2018 | Yu | |

| | | | |
|---|---|---|---|
| 2019/0268379 A1 | 8/2019 | Narayanaswamy | |
| 2020/0059451 A1 | 2/2020 | Huang | |
| 2020/0169570 A1 | 5/2020 | Kleymenov | |
| 2020/0228500 A1 | 7/2020 | Olumofin | |
| 2021/0097168 A1 | 4/2021 | Patel | |
| 2021/0126901 A1 | 4/2021 | Rodriguez | |
| 2021/0203693 A1 | 7/2021 | Clausen | |
| 2021/0266293 A1 * | 8/2021 | Liu | H04L 61/5007 |
| 2021/0400061 A1 * | 12/2021 | Antoniewicz | H04L 61/4511 |
| 2022/0070194 A1 | 3/2022 | Pon | |

OTHER PUBLICATIONS

Alan Shaikh, Botnet Analysis and Detection System, Nov. 2010.
Antonakakis et al., DGAs and Cyber-Criminals: A Case Study, 2012.
Antonakakis et al., From Throw-Away Traffic to Bots: Detecting the Rise of DGA-Based Malware, 21st {USENIX} Security Symposium ({USENIX} Security 12), 2012, pp. 491-506.
Christian Rossow, Thesis, Using Malware Analysis to Evaluate Botnet Resilience, Apr. 23, 2013.
Dietrich et al., On Botnets That Use DNS for Command and Control, 2011 Seventh European Conference on Computer Network Defense, 2011, pp. 9-16.
Gavin E. Crooks, Inequalities Between the Jenson-Shannon and Jeffreys Divergences, 2008.
Greg Farnham et al., Detecting DNS Tunneling, SANS Institute InfoSec Reading Room, accepted on Feb. 25, 2013.
Guy Bruneau, DNS Sinkhole, Aug. 7, 2010, Sans Institute InfoSec Reading Room, pp. 1-41.
Ivan Nikolaev, Network Service Anomaly Detection, Jun. 2014.
Liu et al., CCGA: Clustering and Capturing Group Activities for DGA-Based Botnets Detection, 2019 18th IEEE International Conference on Trust, Security and Privacy in Computing and Communications/ 13th IEEE International Conference on Big Data Science and Engineering, Aug. 5, 2019, pp. 136-143.
Martin Rataj, Simulation of Botnet C&C Channels, 2014.
Mustafa Toprak, Intrusion Detection System Alert Correlation with Operating System Level Logs, Dec. 11, 2009.
Nadler et al., Detection of Malicious and Low Throughput Data Exfiltration Over the DNS Protocol, Jun. 18, 2018.
Palo Alto Networks, We Know it Before You Do: Predicting Malicious Domains, retrieved on Jun. 22, 2015.
Pedro Marques da LUZ, Thesis, Botnet Detection Using Passive DNS, 2013/2014.
Qi et al., A Bigram Based Real Time DNS Tunnel Detection Approach, Procedia Computer Science 17, 2013, pp. 852-860.
Qi et al., BotCensor: Detecting DGA-Based Botnet Using Two-Stage Anomaly Detection, 2018 17th IEEE International Conference on Trust, Security and Privacy in Computing and Communications/ 12th IEEE International Conference on Big Data Science and Engineering, Aug. 1, 2018, pp. 754-762.
Schuppen et al., FANCI: Feature-based Automated NXDomain Classification and Intelligence, Proceedings of the 27th USENIX Security Symposium, Aug. 2018, pp. 1165-1181.
Sebastian Garcia, Identifying, Modeling and Detecting Botnet Behaviors in the Network, Nov. 2014.
Seung Won Shin, Protecting Networked Systems from Malware Threats, Aug. 2013.
Shehar Bano, A Study of Botnets: Systemization of Knowledge and Correlation-based Detection, Oct. 2012.
Van Der Toorn et al., TXTing 101: Finding Security Issues in the Long Tail of DNS TXT Records, 2020 IEEE European Symposium on Security and Privacy Workshops, 2020, pp. 544-549.
Mshnu Teja Kilari, Thesis, Detection of Advanced Bots in Smartphones Through User Profiling, Dec. 2013.
Xu et al., We Know it Before You Do: Predicting Malicious Domains, Virus Bulletin Conference Sep. 2014.
Xu et al., We Know it Before You Do: Predicting Malicious Domains, Sep. 2014.

* cited by examiner

102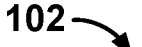
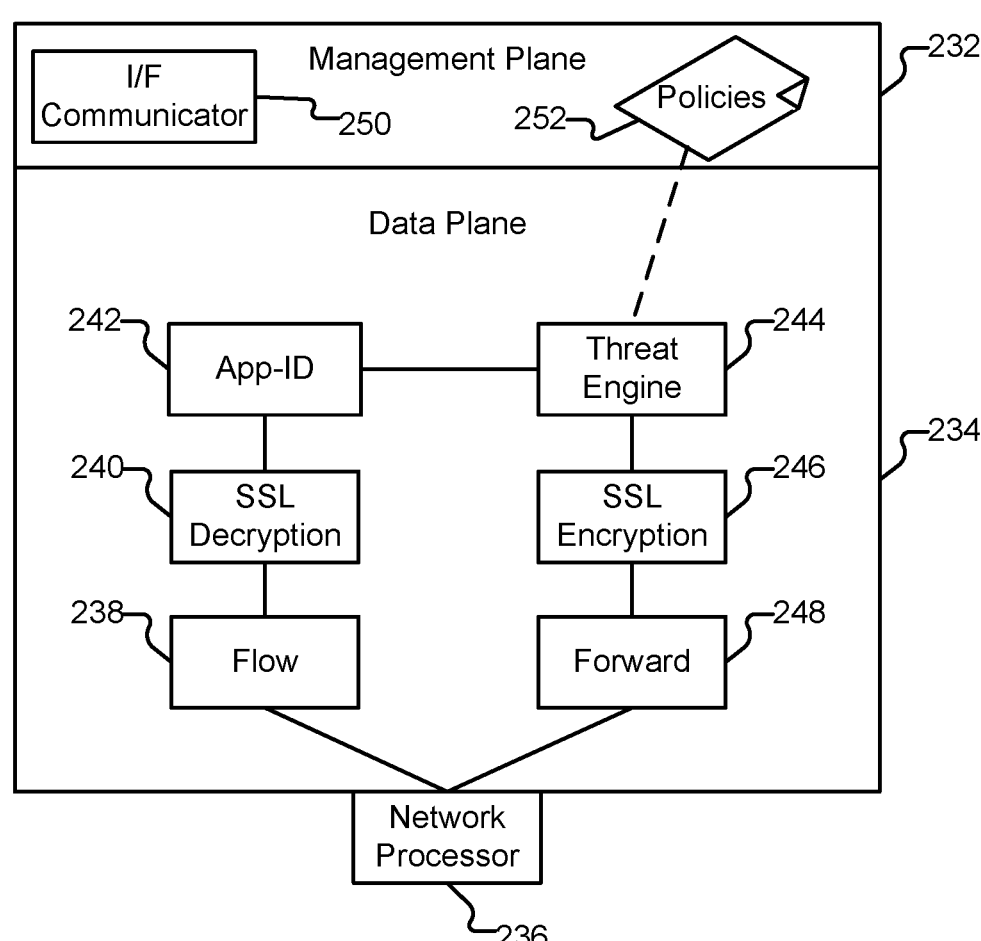
FIG. 2B e9597c94b47db194b4cbf033120412288c9b1979.154526501.t.panorama9.com (benign) ⟍ 302 c881c3f9040f0678983438bfb70369b1a16c383c.154526505.t.panorama9.com (benign) ⟍ 304 aHR0cDovLzgyLjEwMi4xNC4y.0.d.12406.microsoft-publisher.com (tunneling) ⟍ 306

Figure 3:
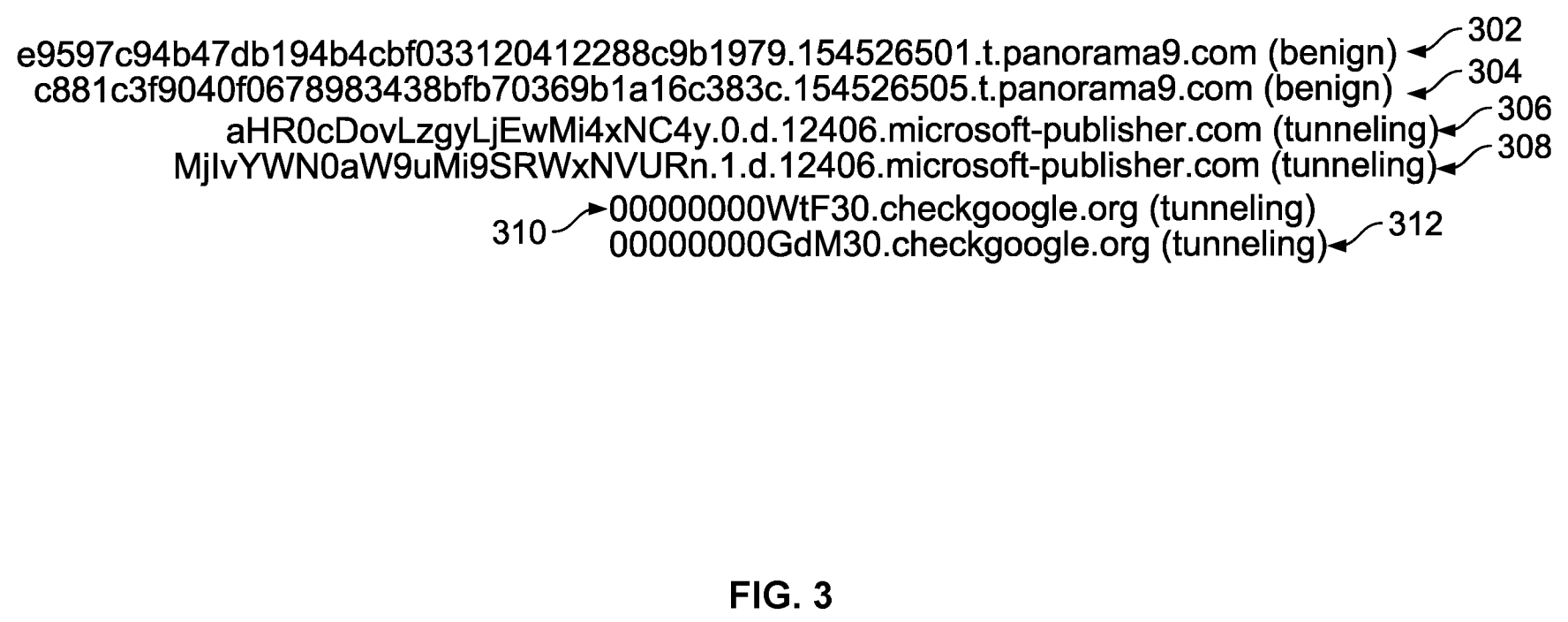

MjIvYWN0aW9uMi9SRWxxNVURn.1.d.12406.microsoft-publisher.com (tunneling) ⟍ 308

310 ⟶ 00000000WtF30.checkgoogle.org (tunneling) ⟍ 312

00000000GdM30.checkgoogle.org (tunneling)

| | |
|---|---|
| reddit.map.fastly.net | 1.0 |
| dualstack.f3.shared.global.fastly.net | 0.913 (f3 is not meaningful) |
| p23-buy.itunes-apple.com.akadns.net | 0.85 (p23 is not meaningful) |
| prod.nexusrules.live.com.akadns.net | 1.0 |

452 454

| | |
|---|---|
| 1861lDa23d57f90-0-2D-2D.prosalar.com | 0 |
| 9773lDa23d57f91-0-2D-2D.prosalar.com | 0 |
| 000000C299F0C7C3FCA287.proxycheker.pro | 0 |
| 000C0002909FC7C39A467.proxycheker.pro | 0 |

500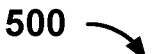
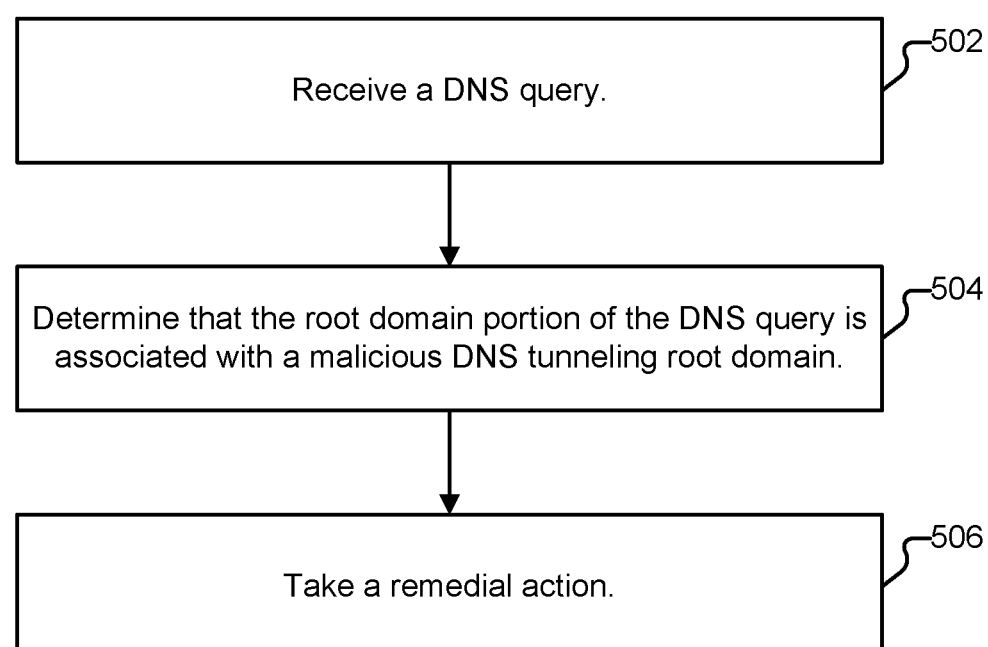
FIG. 5

| | DNS Semantics | Detection Opportunity |
|---|---|---|
| A/AAAA | A domain is resolved to a set of correlated IP addresses | Many random suspicious IPs are returned for a domain used as DNS infiltration |
| CNAME | A domain is usually mapped to a single legitimate one | Domains in infiltration traffic are mapped to many suspicious/invalid ones |
| NS/MX/etc. | Specify a domain's valid authoritative nameserver, mail server, etc. | Servers returned in DNS infiltration traffic are invalid or suspicious |
| TXT | Most TXT data in benign cases has certain patterns | Arbitrary text, e.g., base64 encoded data, is sent in infiltration traffic. |

FIG. 9

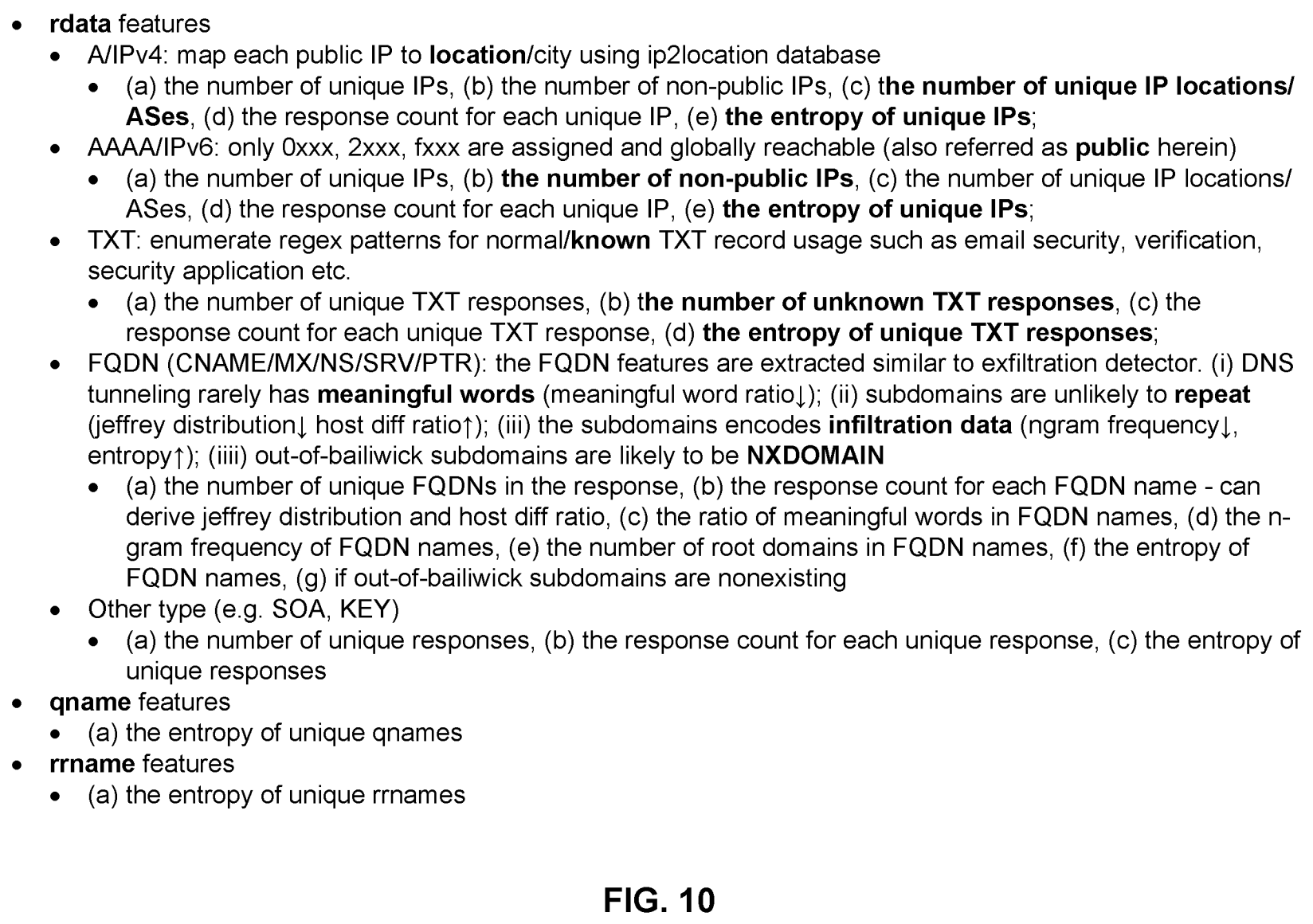

- rdata features
  - A/IPv4: map each public IP to location/city using ip2location database
    - (a) the number of unique IPs, (b) the number of non-public IPs, (c) the number of unique IP locations/ ASes, (d) the response count for each unique IP, (e) the entropy of unique IPs;
  - AAAA/IPv6: only 0xxx, 2xxx, fxxx are assigned and globally reachable (also referred as public herein)
    - (a) the number of unique IPs, (b) the number of non-public IPs, (c) the number of unique IP locations/ ASes, (d) the response count for each unique IP, (e) the entropy of unique IPs;
  - TXT: enumerate regex patterns for normal/known TXT record usage such as email security, verification, security application etc.
    - (a) the number of unique TXT responses, (b) the number of unknown TXT responses, (c) the response count for each unique TXT response, (d) the entropy of unique TXT responses;
  - FQDN (CNAME/MX/NS/SRV/PTR): the FQDN features are extracted similar to exfiltration detector. (i) DNS tunneling rarely has meaningful words (meaningful word ratio↓); (ii) subdomains are unlikely to repeat (jeffrey distribution↓ host diff ratio↑); (iii) the subdomains encodes infiltration data (ngram frequency↓, entropy↑); (iiii) out-of-bailiwick subdomains are likely to be NXDOMAIN
    - (a) the number of unique FQDNs in the response, (b) the response count for each FQDN name - can derive jeffrey distribution and host diff ratio, (c) the ratio of meaningful words in FQDN names, (d) the n- gram frequency of FQDN names, (e) the number of root domains in FQDN names, (f) the entropy of FQDN names, (g) if out-of-bailiwick subdomains are nonexisting
  - Other type (e.g. SOA, KEY)
    - (a) the number of unique responses, (b) the response count for each unique response, (c) the entropy of unique responses
- qname features
  - (a) the entropy of unique qnames
- rrname features
  - (a) the entropy of unique rrnames

FIG. 10

Figure 11:
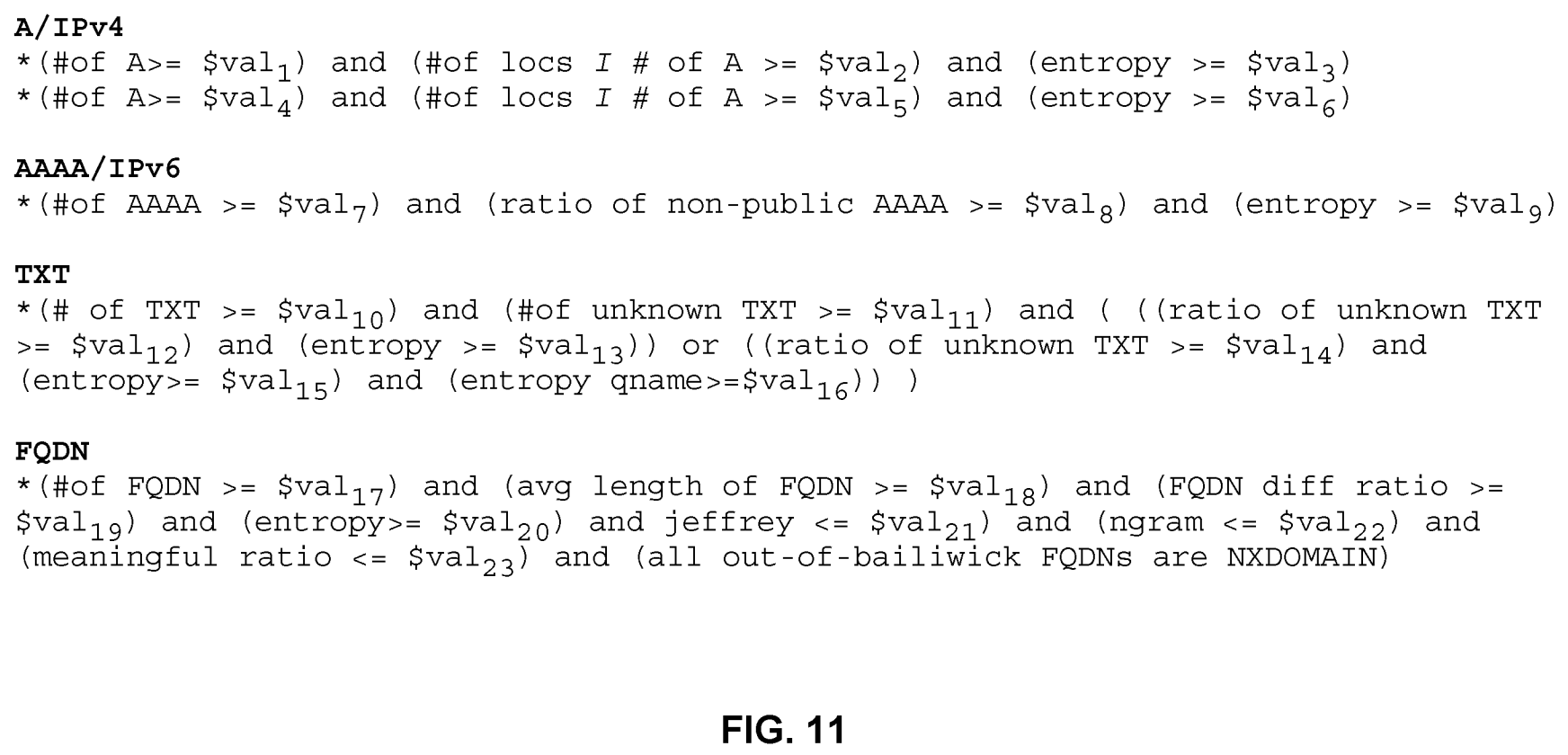

A/IPv4
* (#of A >= $val_1$) and (#of locs I # of A >= $val_2$) and (entropy >= $val_3$)
* (#of A >= $val_4$) and (#of locs I # of A >= $val_5$) and (entropy >= $val_6$)

AAAA/IPv6
* (#of AAAA >= $val_7$) and (ratio of non-public AAAA >= $val_8$) and (entropy >= $val_9$)

TXT
* (# of TXT >= $val_{10}$) and (#of unknown TXT >= $val_{11}$) and (((ratio of unknown TXT >= $val_{12}$) and (entropy >= $val_{13}$)) or ((ratio of unknown TXT >= $val_{14}$) and (entropy >= $val_{15}$) and (entropy qname=$val_{16}$)))

FQDN
* (#of FQDN >= $val_{17}$) and (avg length of FQDN >= $val_{18}$) and (FQDN diff ratio >= $val_{19}$) and (entropy>= $val_{20}$) and jeffrey <= $val_{21}$) and (ngram <= $val_{22}$) and (meaningful ratio <= $val_{23}$) and (all out-of-bailiwick FQDNs are NXDOMAIN)

REAL-TIME DETECTION OF DNS INFILTRATION TRAFFIC

REFERENCE TO OTHER APPLICATIONS

This application claims priority to U.S. Provisional Patent Application No. 63/432,963 entitled REAL-TIME DETECTION OF DNS INFILTRATION TRAFFIC filed Dec. 15, 2022 which is incorporated herein by reference for all purposes.

BACKGROUND OF THE INVENTION

Nefarious individuals attempt to compromise computer systems in a variety of ways. As one example, such individuals may embed or otherwise include malicious software ("malware") in email attachments and transmit or cause the malware to be transmitted to unsuspecting users. When executed, the malware compromises the victim's computer. Some types of malware will instruct a compromised computer to communicate with a remote host. For example, malware can turn a compromised computer into a "bot" in a "botnet," receiving instructions from and/or reporting data to a command and control (C&C) server under the control of the nefarious individual. One approach to mitigating the damage caused by malware is for a security company (or other appropriate entity) to attempt to identify malware and prevent it from reaching/executing on end user computers. Another approach is to try to prevent compromised computers from communicating with the C&C server. Unfortunately, malware authors are using increasingly sophisticated techniques to obfuscate the workings of their software. As one example, some types of malware use Domain Name System (DNS) query responses to infiltrate data. Accordingly, there exists an ongoing need for improved techniques to detect malware and prevent its harm.

BRIEF DESCRIPTION OF THE DRAWINGS

Various embodiments of the invention are disclosed in the following detailed description and the accompanying drawings.

FIG. 2B is a functional diagram of logical components of an embodiment of a data appliance.

FIG. 3 illustrates benign DNS query information and malicious DNS query information.

FIG. 5 illustrates an example of a process for detecting malicious DNS tunneling activity.

FIG. 9 illustrates various types of features which can be used in detecting DNS tunneling.

FIG. 10 illustrates various features which can be computed from DNS information.

FIG. 11 illustrates examples of detection rules that can be used in connection with various of the features described herein.

DETAILED DESCRIPTION

Figure 1:
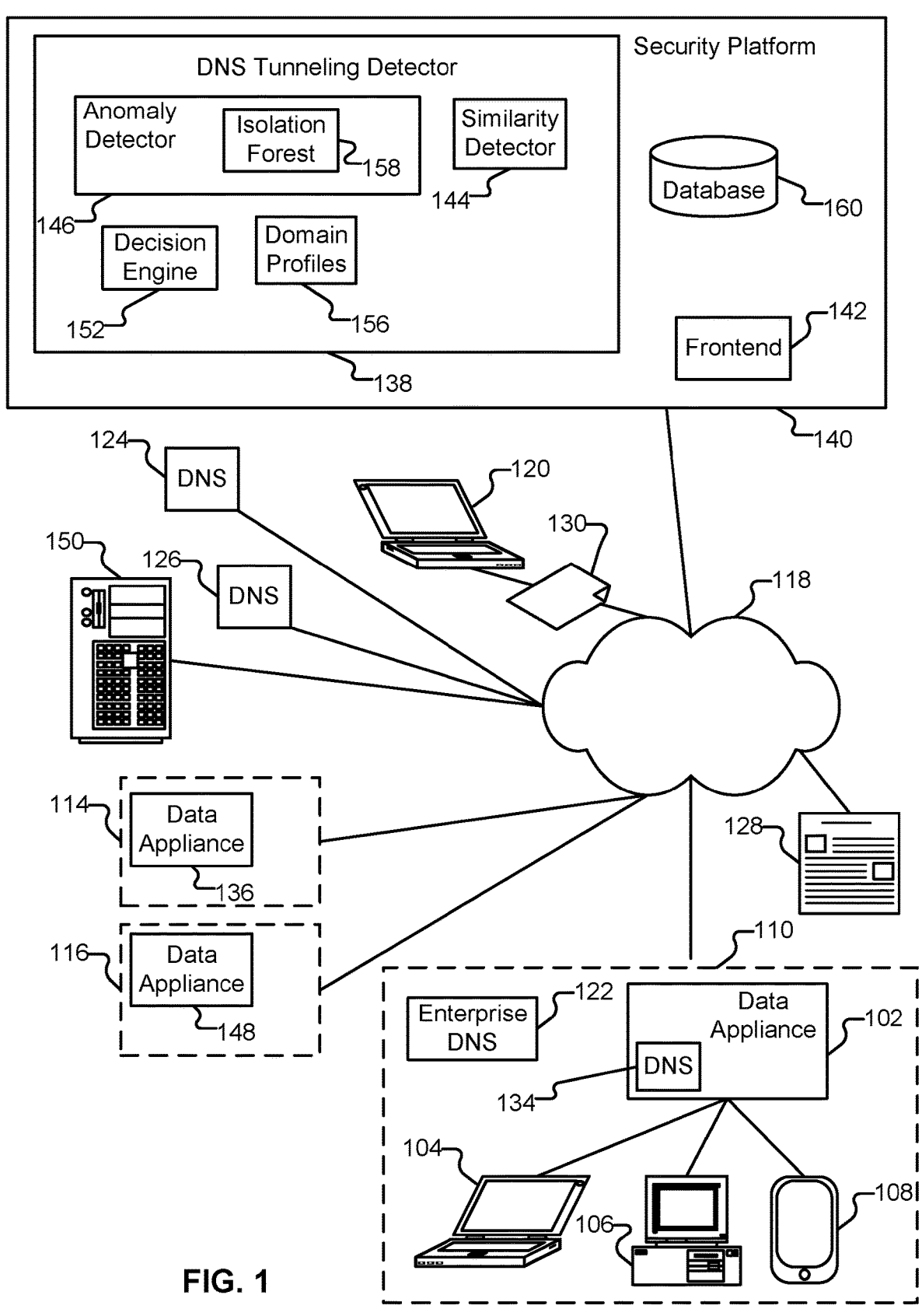
FIG. 1 illustrates an example of an environment in which malware is detected and its harm reduced.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Overview

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QOS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API, allow enterprises to proactively monitor VM changes dynamically feeding that context into security policies, thereby eliminating the policy lag that may occur when VMs change.

II. Example Environment

FIG. 1 illustrates an example of an environment in which malware is detected and its harm reduced. In the example shown, client devices 104-108 are a laptop computer, a desktop computer, and a tablet (respectively) present in an enterprise network 110 (belonging to the "Acme Company"). Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, files exchanged through instant messaging programs, and/or other file transfers. In some embodiments, data appliance 102 is also configured to enforce policies with respect to traffic that stays within enterprise network 110.

Data appliance 102 can be configured to work in cooperation with a remote security platform 140. Security platform 140 can provide a variety of services, including performing static and dynamic analysis on malware samples, and providing a list of signatures of known-malicious files to data appliances, such as data appliance 102 as part of a subscription. In various embodiments, results of analysis (and additional information pertaining to applications, domains, etc.) are stored in database 160. In various embodiments, security platform 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix Xen-Server, or Microsoft Hyper-V. In some embodiments, the virtual machine server is omitted. Further, a virtual machine server may be under the control of the same entity that administers security platform 140, but may also be provided by a third party. As one example, the virtual machine server can rely on EC2, with the remainder portions of security platform 140 provided by dedicated hardware owned by and under the control of the operator of security platform 140.

Figure 2A:
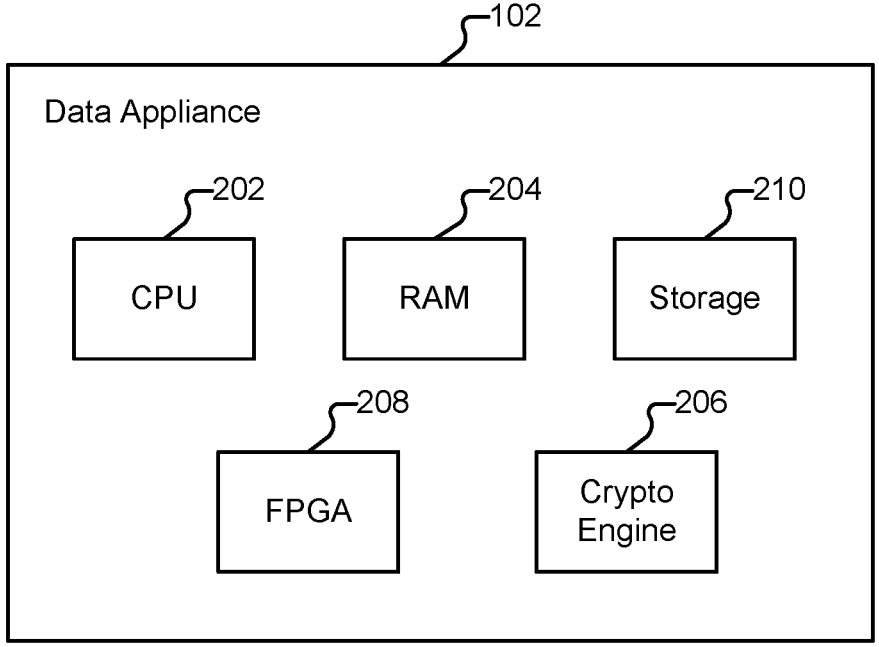
FIG. 2A illustrates an embodiment of a data appliance.

An embodiment of a data appliance is shown in FIG. 2A. The example shown is a representation of physical components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disks or solid state storage units). In various embodiments, data appliance 102 stores (whether in RAM 204, storage 210, and/or other appropriate locations) information used in monitoring enterprise network 110 and implementing disclosed techniques. Examples of such information include application identifiers, content identifiers, user identifiers, requested URLs, IP address mappings, policy and other configuration information, signatures, hostname/URL categorization information, malware profiles, and machine learning models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client device 104 or client device 106) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 110. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, e.g., a web browsing session, the identified application can change, and such changes will be noted by data appliance 102. For example a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 250 is provided for management communications (e.g., via (REST) APIs, messages, or network protocol communications or other communication mechanisms).

III. DNS Tunneling Traffic

A. Overview of DNS Tunneling

Returning to FIG. 1, suppose that a malicious individual (using system 120) has created malware 130. The malicious individual hopes that a client device, such as client device 104, will execute a copy of malware 130, compromising the client device, and causing the client device to become a bot in a botnet. The compromised client device can then be instructed to perform tasks (e.g., cryptocurrency mining, or participating in denial of service attacks) and/or to report information to an external entity (e.g., associated with such tasks, exfiltrate sensitive corporate data, etc.), such as command and control (C&C) server 150, as well as to receive instructions from C&C server 150, as applicable.

While malware 130 might attempt to cause the compromised client device to directly communicate with C&C server 150 (e.g., by causing the client to send an email to C&C server 150), such overt communication attempts could be flagged (e.g., by data appliance 102) as suspicious/harmful and blocked. Increasingly, instead of causing such direct communications to occur, malware authors use a technique referred to herein as DNS tunneling. DNS is a protocol that translates human-friendly URLs, such as paloaltonetworks.com, into machine-friendly IP addresses, such as 199.167.52.137. DNS tunneling exploits the DNS protocol to tunnel malware and other data through a client-server model. In an example attack, the attacker registers a domain, such as badsite.com. The domain's name server points to the attacker's server, where a tunneling malware program is installed. The attacker infects a computer. Because DNS requests are traditionally allowed to move in and out of security appliances, the infected computer is allowed to send a query to the DNS resolver (e.g., to kj32hkjqfeuo32ylhkjshdflu23.badsite.com, where the subdomain portion of the query encodes information for consumption by the C&C server). The DNS resolver is a server that relays requests for IP addresses to root and top-level domain servers. The DNS resolver routes the query to the attacker's C&C server, where the tunneling program is installed. A connection is now established between the victim and the attacker through the DNS resolver. This tunnel can be used to exfiltrate data or for other malicious purposes.

Detecting and preventing DNS tunneling attacks is difficult for a variety of reasons. A first reason is illustrated in FIG. 3 which shows both benign DNS query information (302, 304) and malicious DNS query information (306-312). Many legitimate services (e.g., content delivery networks, web hosting companies, etc.) legitimately use the subdomain portion of a domain name to encode information to help support use of those legitimate services. The encoding patterns used by such legitimate services can vary widely among providers and (as illustrated in FIG. 3) benign subdomains can appear visually indistinguishable from malicious ones. A second reason is that, unlike other areas of (e.g., computer research) which have large corpuses of both known benign and known malicious training set data, training set data for DNS queries is heavily lopsided (e.g., with millions of benign root domain examples and very few malicious examples). Despite such difficulties, and using techniques described herein, malicious DNS tunneling can efficiently be detected, in real time, and stopped.

B. DNS Resolution

The environment shown in FIG. 1 includes three Domain Name System (DNS) servers (122-126). As shown, DNS server 122 is under the control of ACME (for use by computing assets located within network 110), while DNS server 124 is publicly accessible (and can also be used by computing assets located within network 110 as well as other devices, such as those located within other networks (e.g., networks 114 and 116 having respective data appliances 136 and 148)). DNS server 126 is publicly accessible but under the control of the malicious operator of C&C server 150. Enterprise DNS server 122 is configured to resolve enterprise domain names into IP addresses, and is further configured to communicate with one or more external DNS servers (e.g., DNS servers 124 and 126) to resolve domain names as applicable.

As mentioned above, in order to connect to a legitimate domain (e.g., www.example.com depicted as site 128), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C&C server 150, client device 104 will need to resolve the domain, "kj32hkjqfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C&C server 150 to receive data from client device 104.

In various embodiments, data appliance 102 includes a DNS module 134, which is configured to facilitate determining whether client devices (e.g., client devices 104-108) are attempting to engage in malicious DNS tunneling, and/or prevent connections (e.g., by client devices 104-108) to malicious DNS servers. DNS module 134 can be integrated into appliance 102 (as shown in FIG. 1) and can also operate as a standalone appliance in various embodiments. And, as with other components shown in FIG. 1, DNS module 134 can be provided by the same entity that provides appliance 102 (or security platform 140), and can also be provided by a third party (e.g., one that is different from the provider of appliance 102 or security platform 140). Further, in addition to preventing connections to malicious DNS servers, DNS module 134 can take other actions, such as individualized logging of tunneling attempts made by clients (an indication that a given client is compromised and should be quarantined, or otherwise investigated by an administrator).

In various embodiments, when a client device (e.g., client device 104) attempts to resolve a domain, DNS module 134 uses the domain as a query to security platform 140. This query can be performed concurrently with resolution of the domain (e.g., with the request sent to DNS servers 122, 124, and/or 126 as well as security platform 140). As one example, DNS module 134 can send a query (e.g., in the JSON format) to a frontend 142 of security platform 140 via a REST API. Using processing described in more detail below, security platform 140 will determine (e.g., using DNS tunneling detector 138) whether the queried domain indicates a malicious DNS tunneling attempt and provide a result back to DNS module 134 (e.g., "malicious DNS tunneling" or "non-tunneling").

C. DNS Tunneling Detection

In various embodiments, DNS tunneling detector 138 (whether implemented on security platform 140, on data appliance 102, or other appropriate location/combinations of locations) uses a two-pronged approach in identifying malicious DNS tunneling. The first approach uses anomaly detector 146 (e.g., implemented using python) to build a set of real-time profiles (156) of DNS traffic for root domains. The second approach uses signature generation and matching (also referred to herein as similarity detection, and, e.g., implemented using Go). The two approaches are complementary. The anomaly detector serves as a generic detector that can identify previously unknown tunneling traffic. However, the anomaly detector may need to observe multiple DNS queries before detection can take place. In order to block the first DNS tunneling packet, similarity detector 144 complements anomaly detector 146 and extracts signatures from detected tunneling traffic which can be used to identify situations where an attacker has registered new malicious tunneling root domains but has done so using tools/malware that are similar to the detected root domains.

As data appliance 102 receives DNS queries (e.g., from DNS module 134), it provides them to security platform 140 which performs both anomaly detection and similarity detection, respectively. In various embodiments, a domain (e.g., as provided in a query received by security platform 140) is classified as a malicious DNS tunneling root domain if either detector flags the domain.

1. Anomaly Detector

DNS tunneling detector 138 maintains a set of fully qualified domain names (FQDNs), per appliance (from which the data is received), grouped in terms of their root domains (illustrated collectively in FIG. 1 as domain profiles 156). (Though grouping by root domain is generally described in the Specification, it is to be understood that the techniques described herein can also be extended to arbitrary levels of domains.) In various embodiments, information about the received queries for a given domain is persisted in the profile for a fixed amount of time (e.g., a sliding time window of ten minutes).

As one example, DNS query information received from data appliance 102 for various foo.com sites is grouped (into a domain profile for the root domain foo.com) as: G(foo.com)=[mail.foo.com, coolstuff.foo.com, domain1234.foo.com]. A second root domain would have a second profile with similar applicable information (e.g., G(baddomain.com)=[lskjdf23r.baddomain.com, kj235hdssd233.baddomain.com]). Each root domain (e.g., foo.com or baddomain.com) is modeled using a set of characteristics unique to malicious DNS tunneling, so that even though benign DNS patterns are diverse (e.g., k2jh3i8y35.legitimatesite.com, xxx888222000444.otherlegitimatesite.com), they are highly unlikely to be misclassified as malicious tunneling. The following are example characteristics that can be extracted as features (e.g., into a feature vector) for a given group of domains (i.e., sharing a root domain).

1. The number of distinct FQDNs in the group: Typically, legitimate domains will tend to have a small number of FQDNs (e.g., mail.example.com and ftp.example.com). In contrast, as malicious DNS tunneling encodes a message, significantly more FQDNs will be used. An example value for this feature for a benign domain is "5" and an example value for this feature for a malicious domain is "568."

2. The average DNS query count for each FQDN: Typically, legitimate domains will tend to have many queries (for a small number of FQDNs). In contrast, as malicious DNS tunneling encodes a message, each FQDN will typically have only one query count.

3. The Jeffrey distribution of DNS query counts for all FQDNs: Typically, legitimate domains will tend to have a nonzero number. In contrast, malicious DNS tunneling domains will tend to have a zero number.

4. The average length of FQDNs in the group: Typically, legitimate domains will tend to have shorter average domain name lengths than malicious DNS tunneling domains.

5. The ratio of queries for A/AAAA/CNAME/NS/MX records: Typically, the kinds of queries performed involving legitimate domains will involve A, MX, and CNAME records. The ratio of different kinds of queries can be used as a feature.

Figure 4A:
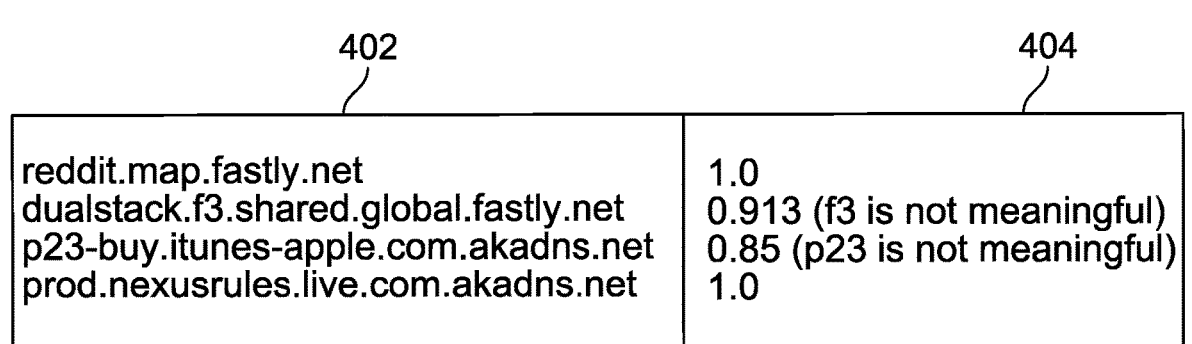
FIGS. 4A and 4B respectively illustrate meaningful word ratios for example legitimate and malicious domains.
Figure 4B:
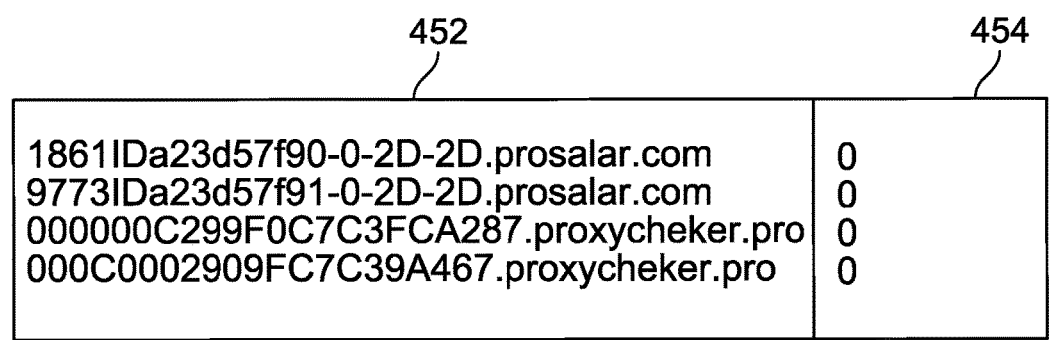

6. The ratio of meaningful words in all FQDN names in the group: Typically, legitimate domains (e.g., content delivery network domains) will include meaningful words in subdomain names (e.g., as determinable using a dictionary or other list of predetermined words). In contrast, as malicious DNS tunneling encodes a message, such subdomains generally comprise meaningless characters. FIGS. 4A and 4B respectively illustrate meaningful word ratios for example legitimate and malicious domains. In particular, region 402 lists a set of legitimate domains, region 452 lists a set of malicious domains, and their respective ratios are shown in regions 404 and 454. In the examples shown in FIGS. 4A and 4B, the ratio is computed as the number of characters comprising meaningful words out of all characters in the subdomain.

7. The n-gram frequency of all FQDN names in the group: The type of "n" gram used can be set variously in different embodiments. In an example embodiment, 4-grams are evaluated. Typically, legitimate domains will tend to have lower 4-gram frequency than malicious DNS tunneling domains.

8. The entropy of the FQDNs in the group: Typically, legitimate domains will tend to have less entropy in their FQDNs than malicious DNS tunneling domains.

9. Whether or not the domains use trusted authoritative DNS servers: Typically, legitimate domains will use well-established third party managed DNS servers. For example, 44 million root domains use domaincontrol.com (provided by GoDaddy). While a few legitimate root domains (e.g., google.com) manage their own DNS servers (e.g., ns.google.com), such DNS servers can also be considered as trusted. In contrast, in order for malicious DNS tunneling to work, the DNS server (e.g., proxychecker.pro, ziyouforever.com, 63z.de) needs to be controlled by the tunneling domain. For this feature, a root domain is assigned a value of "1" if it uses a trusted authoritative DNS server (e.g., as determined by comparing its DNS server(s) against a whitelist of known trusted DNS servers) and a "0" otherwise.

10. The compression rate of the FQDNs in the group: Typically, malicious DNS tunneling domain names contain compressed data. The compression rate of domain names can be used as a feature (e.g., as length of GZIPed string/length of original string).

In various embodiments, the feature vector associated with a given root domain (e.g., foo.com) is updated each time a DNS query associated with that root domain is received by security platform 140. Each time the feature vector for a root domain (e.g., foo.com) is updated, it is checked against a pre-built benign traffic model. The model can be built using any appropriate anomaly detection approach, and stays stable, even across different networks. One example of such an approach is an isolation forest approach (e.g., implemented using the scikit-learn python tool) where an ensemble of iTrees is built, with each iTree representing a domain profile of benign DNS queries. The isolation forest approach is fast, computation and memory efficient, scales to a very large dataset, and can be particularly useful where (e.g., with malicious DNS tunneling traffic) the training data set is heavily lopsided (i.e., with many more available benign examples than malicious ones). In various embodiments, isolation forest 158 is trained using benign traffic only (e.g., using feature vectors previously collected for benign DNS query information). Any anomalies detected by the model are anomalous to benign DNS traffic and thus can be classified as malicious DNS tunneling traffic. If the traffic is determined to be malicious DNS tunneling, a remedial action can be taken (e.g., with security platform 140 instructing data appliance 102 to block any traffic that includes the root domain (thus also blocking any subdomains)).

2. Similarity Detector

While an attacker may use multiple different domains for DNS tunneling (e.g., xyz.baddomain.com and abc.terriblespamsite.io), those domains may share at least a portion of infrastructure. For example, both sites may make use of similar message encoding schemes for receiving DNS tunneled messages (e.g., 1861IDa23d57f90-0-2D-2D.baddomain.com and 9773IDa23d57f91-0-2D-2D.terriblespamsite.io, where "-0-2D-2D" is common to both). Such patterns can be extracted (e.g., using python) from known malicious DNS tunneling messages (e.g., by DNS tunneling detector 138) and stored as regular expressions for use by similarity detector 144. Similarly, both baddomain.com and terriblespamsite.io may make use of a DNS server having a single IP address (e.g., 123.45.67.89) to receive their respective DNS queries. IP addresses of known DNS tunneling servers can also be used by similarity detector 144.

In addition to providing DNS query information received from data appliance 102 to anomaly detector 146, in various embodiments, security platform 140 also provides the information to similarity detector 144. Similarity detector 144 is configured to use a set of previously determined regular expressions and previously determined IP addresses (corresponding to known malicious tunneling traffic/servers) to detect new malicious DNS tunneling servers.

D. Example Process

FIG. 5 illustrates an example of a process for detecting malicious DNS tunneling activity. In various embodiments, process 500 is performed by security platform 140. Process 500 can also be performed by other types of platforms/devices, as applicable, such as data appliance 102, client device 104, etc. Process 500 begins at 502 when a DNS query is received. As one example, a DNS query is received at 502 by frontend 142 when DNS module 134 receives (whether actively or passively) a DNS resolution request from client device 104. In some embodiments, DNS module 134 provides all DNS resolution requests as queries to platform 140 for analysis. DNS module 134 can also more selectively provide such requests to platform 140. One example reason DNS module 134 might not query platform 140 for a domain is where information associated with the domain is cached in data appliance 102 (e.g., because client device 106 previously requested resolution of the domain and process 500 was previously performed with respect to the domain). Another example reason is that the domain is on a whitelist/blacklist/etc., and so additional processing is not needed.

At 504, a determination is made that a root domain portion of the received DNS query is associated with a malicious DNS tunneling root domain. As described above, two example tools for making such a determination are anomaly detector 146 or similarity detector 144. If either (or both) such tool makes such a determination, decision engine 152 (or any other appropriate component, including anomaly detector 146 and similarity detector 144 themselves) can conclude that a remedial action should be taken in response. Finally, at 506, one or more appropriate remedial actions are taken. Examples of such actions include platform 140 instructing data appliance 102 to block further communication with the implicated root level domain, informing data appliance 102 that the domain is a malicious tunneling domain (but allowing data appliance 102 to make its own determination of what to do as a result, such as alerting an administrator that a given client has attempted to contact a malicious DNS tunneling server and quarantining the client device from other nodes on the network), extracting IP address and/or regular expression pattern information from the implicated DNS query, etc.

Figure 6:
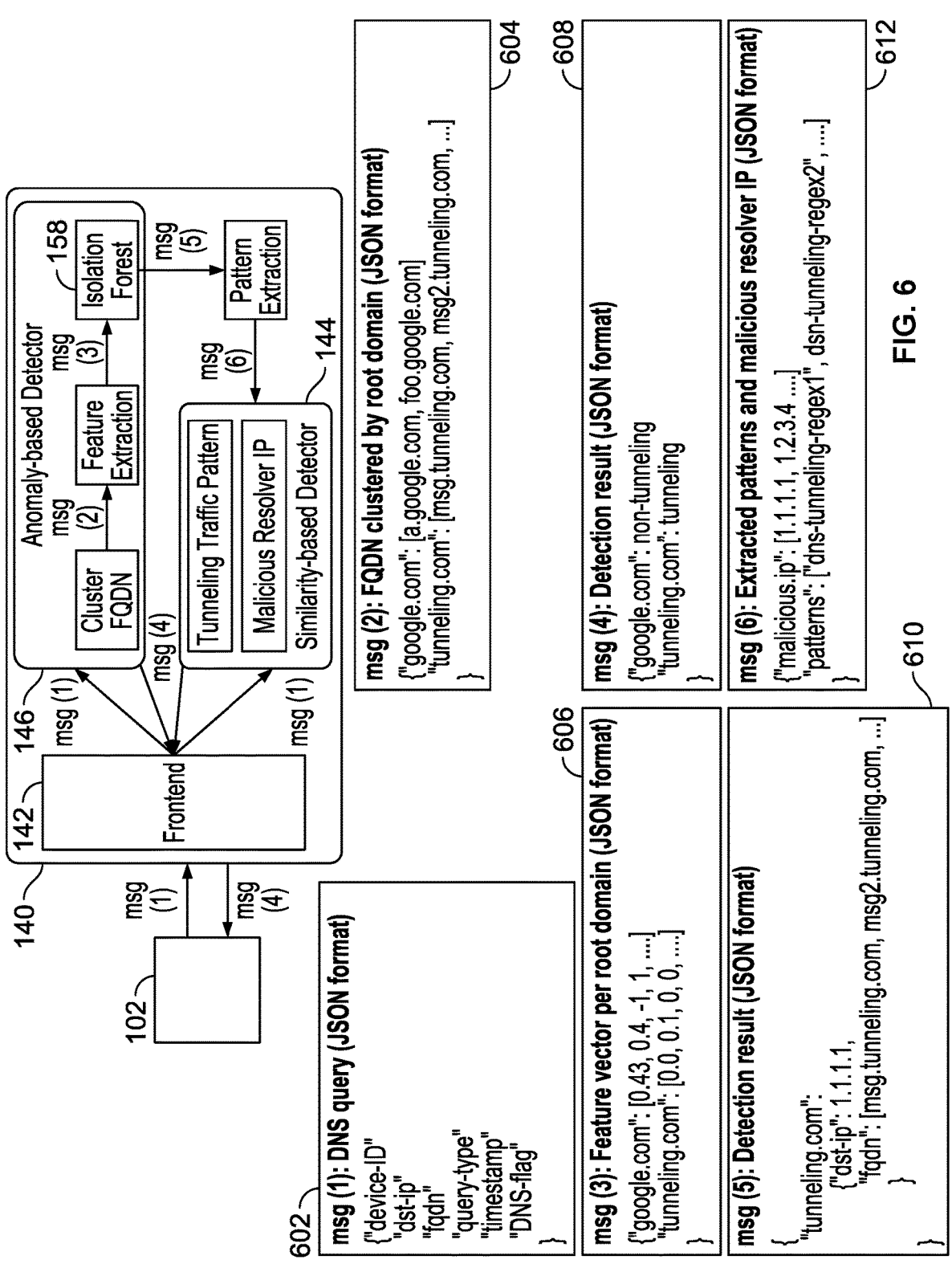
FIG. 6 illustrates example embodiments of messages that can be exchanged between various components of the environment shown in FIG. 1.

FIG. 6 illustrates example embodiments of messages that can be exchanged between various components of the environment shown in FIG. 1. The first message (602) is an example of DNS query information that can be sent by appliance 102 to platform 140. Message 602 is then provided to both the anomaly detector (146) and similarity detector (144). The second message (604) is an example of root domain profile information provided for feature extraction. The third message (606) is an example of feature vector information provided to isolation forest 158. The fourth message (608) is an example of detection results determined by anomaly detector 146. The fifth message (610) is an example of a positive malicious tunneling detection result that can be used for IP address and regular expression pattern extraction. The sixth message (612) is an example of IP address and regular expression patterns after extraction.

IV. Real-Time Detection of DNS Infiltration Traffic

A. Introduction

DNS tunneling refers, generally, to techniques for exploiting the DNS protocol to tunnel malware and other data through a client-server model. As mentioned above, DNS-related attacks can pose particular security challenges because DNS requests (and responses) are often allowed to move in and out of enterprise (and other) networks freely (including through security appliances). Further, the amount of benign DNS traffic far outnumbers the amount of malicious DNS traffic and distinguishing one from the other can be difficult.

Figure 7:
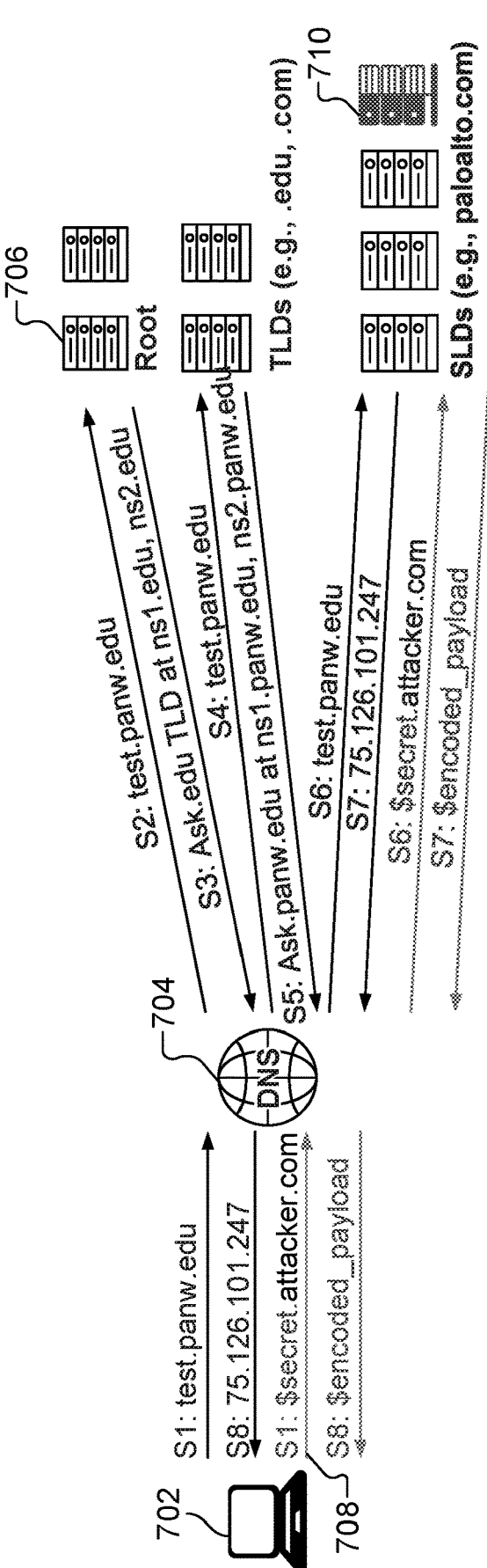
FIG. 7 illustrates various events that happen in benign and malicious DNS resolution scenarios.

FIG. 7 illustrates various events that happen in a typical (benign) DNS resolution scenario, as well as how an attack can be perpetrated by maliciously taking advantage of DNS resolution inefficiencies and vulnerabilities. Suppose a user (hereinafter also referred to as "Alice") of a client device (702) would like to visit a website "test.panw.edu." In the benign example depicted in FIG. 7, she enters that domain into her browser and (assuming a resolution of the domain is not already locally cached) a DNS lookup query is performed against resolver 704 (S1). If resolver 704 does not have a resolution cached, it recursively queries authoritative nameservers to attempt to obtain an answer (e.g., an IP address).

As shown in FIG. 7, resolver 704 first queries a root server (e.g., root server 706) with the domain, "test.panw.edu" (S2). Root server 706 does not have an A record for test.panw.edu, and responds with NS information (S3) indicating that resolver 704 should query applicable top level domain (TLD) nameservers—in this case, "ns1.edu" and "ns2.edu." Resolver 704 queries the applicable TLD nameservers (S4), which also do not have A records for test.panw.edu, and respond with NS information (S5) indicating that resolver 704 should query applicable second level (SLD) nameservers—in this case, "ns1.panw.edu" and "ns2.panw.edu." Resolver 704 queries the applicable SLD nameservers (S6) and finally, these nameservers have an A record for "test.panw.edu." The IP address 75.126.101.247 is provided back to resolver 704 (S7) which in turn provides it to client 702, which can now visit the website.

Among other features, the DNS system was designed to be highly available, fault tolerant, and provide quick responses. Unfortunately, these features can also be leveraged by a malicious individual for nefarious purposes. Suppose client device 702 has been compromised (e.g., malware 130 has compromised client device 702) and an attacker would like to use client device 702 to help perpetrate an attack. The attacker has registered the domain, "attacker.com." The attacker can use client device 702 to exfiltrate data (e.g., secret information to be stolen from within network 110) by causing client device 702 to make a DNS query that encodes (e.g., at the subdomain level, denoted in FIG. 7 as "$secret") the data to be exfiltrated (708) and will ultimately get passed to attacker.com when client device 702 performs a query for the fully qualified domain name that includes $secret. In this scenario, the same sequence of events S2-S6 occurs as in the benign scenario (e.g., querying root 706, querying an applicable TLD nameserver (ns1.com), and querying an applicable SLD nameserver (ns.attacker.com)). However, in this scenario, SLD nameserver 710 is malicious (and under the control of the attacker). DNS is a bidirectional communication. In addition to exfiltrating information via DNS queries (e.g., $secret), the attacker can infiltrate encoded data (e.g., $encoded_payload) back to client 702 via DNS response information (e.g., carrying command and control instructions for client 702 to execute). While attackers can set up malicious resolvers to handle data exfiltration and infiltration via DNS tunneling, such malicious resolvers can be more readily identified than a more typical one which uses trusted resolvers (e.g., 8.8.8.8) but compromised nameservers (to encode messages in subdomains (qname) and response data (rdata)).

Embodiments of security platform 140 (and/or, as applicable embodiments of data appliance 102) can be used to detect and prevent DNS tunneling attacks, including both DNS exfiltration attacks and DNS infiltration attacks.

B. DNS Response Data

In contrast to a DNS query (e.g., a fully qualified domain name), a DNS response contains more information. Of note, a response will include multiple fields, examples of which are as follows:

qname: the query name, e.g., www2.764206.acrobatverify.com rrname: the response record name sent back, e.g., www2.764206.acrobatverify.com rrtype: the resource record type, e.g., AAAA rdata: the resource data of the rrtype, e.g., a107:d99a:3010:103a:d9bc:9edb:ac3:2b30 ttl: time to live, e.g., 60

There are various resource record types that can be used for encoding infiltration payloads. Examples are as follows:

A/IPv4: 632050103011910511 0451B007.poison-frog.club A 121.32.66.30

Here, the IPv4 address (121.32.66.30) is used to encode four bytes of information to the victim.

AAAA/IPV6: www2.764206.acrobatverify.com AAAA a107:d99a:3010:103a:d9bc:9edb:ac3:2b30

Here, the IPV6 address is similarly used to encode sixteen bytes of information to the victim.

TXT: cdn6.fakedns.live TXT MmEzMDNIM2YxYTMwMzAzMDMwMzAzMDc 0N2Y3MzdiNzU2Mjc2Nzk3 . . .

Here, the TXT field can be used to encode virtually anything, similarly with the following responses.

FQDN responses (CNAME/MX/NS/SRV/PTR), where the FQDN appears to be a fully qualified domain name:

CNAME: 0e34015e51331f6de9d2ea0018aaaea657.testc name.com CNAME dce8015e514b05f56599affffff546ceebd.testc name.com MX: 804c013ca2599550f9ff990004723c0636.testmx.com MX 10 ab78013ca2a44fc2b899e4ffff4185b456.testmx.com NS: 50e8013ca2ca6acfa457bd0007e8849e89.testns.com NS aeb0013ca28898db291554ffff4185b456.testns.com And, while the following are less frequently used for infiltration, their values can also be examined for statistical features.

KEY

DNSKEY

RRSIG

C. Example System

Figure 8:
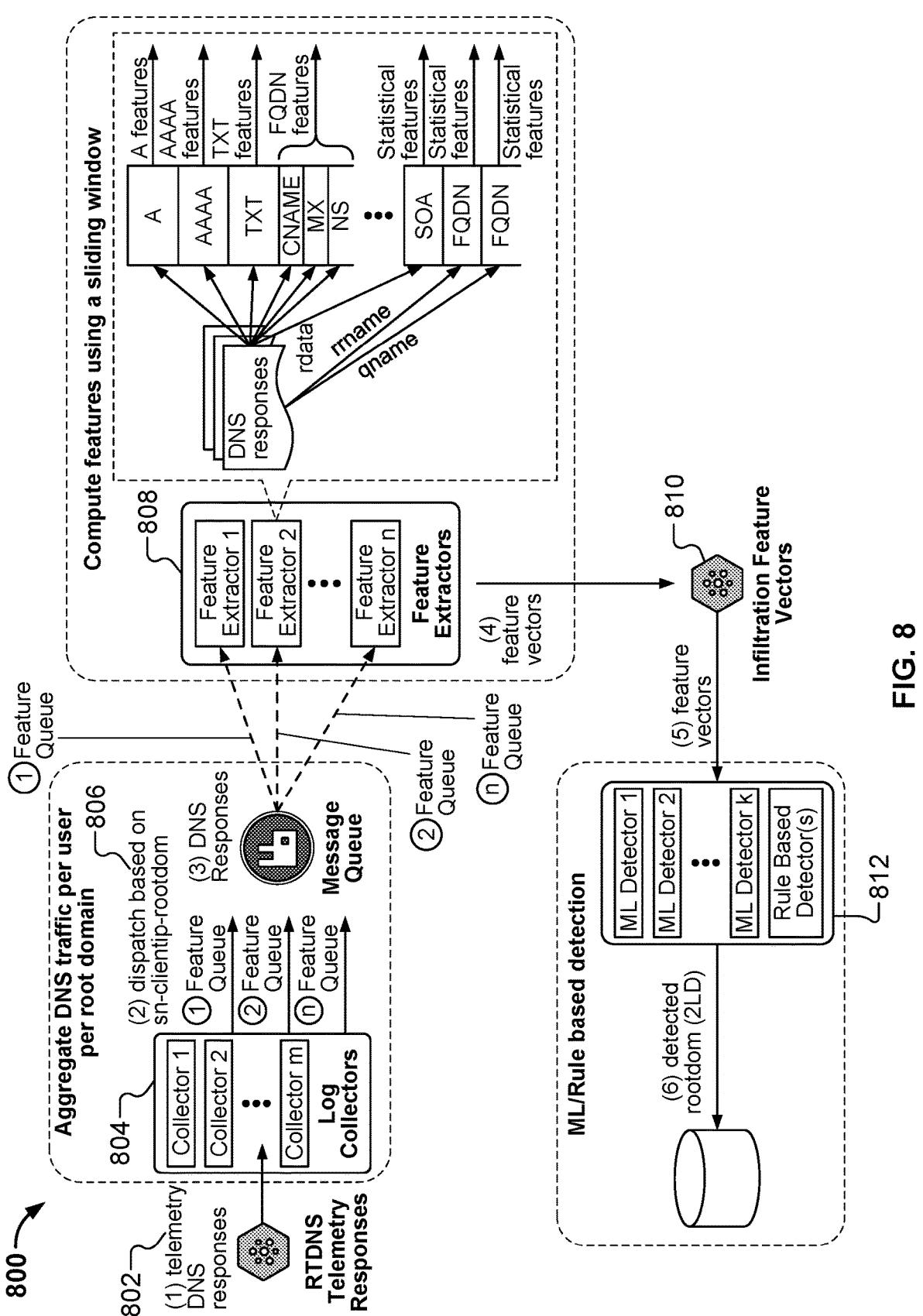
FIG. 8 illustrates an example of a DNS infiltration detector.

FIG. 8 illustrates an example of a DNS infiltration detector. In various embodiments, system 800 (or portions thereof, as applicable) is incorporated into DNS tunneling detector 138. RTDNS Telemetry responses 802 are received into system 800 (e.g., via appliance 102 submitting them using an embodiment of frontend 142). A set of collectors 804 read the responses in parallel, (e.g., from pubsub). Tunneling sessions typically involve a very limited number of packets, but with high entropy. In some embodiments, the responses are dispatched (806) based on an aggregation of a per user, per root domain basis (e.g., sn-clientIP-rootdomain where "sn" is a firewall ID). A sliding time window can be used, by a set of feature extractors 808, when evaluating the session (e.g., a ten minute window) so that per session features can be computed (including by grouping domains based on their roots). In contrast with aggregating traffic for a single domain, this approach (limiting aggregation to a single session between a client and a DNS name server) provides for better accuracy. The parallel feature extractors 808 each listen to a single feature queue and compute features for the sn-clientIP-rootdomain tuple (e.g., for a DNS session, what the IP features look like, what the IPV6 features look like, etc.). The extracted features can be used to send a feature vector to 810 pubsub. Detection can make use of the feature vectors, using rule-based detection and/or a machine learning detector, to determine/predict whether a domain (e.g., attacker.com) is a DNS tunneling domain (e.g., used for infiltration). Aspects shown in FIG. 8 are very similar to those shown in FIG. 6, but rely on different indicators of benign and malicious DNS information.

FIG. 9 illustrates various types of features which can be used in detecting DNS tunneling. For A (IPv4) and AAAA (IPv6), it is common that a domain resolves to a set of correlated IP addresses. As an example, if cloudflare.com is queried for an IP address, the potential response is a fixed set of IP addresses (e.g., tied for load balancing or regional reasons together). In contrast, for DNS tunneling, the returned IP information can be used to encode information and may thus instead appear random/suspicious (e.g., many different IP addresses not sharing a commonality used for the same domain).

For CNAME, commonly, a legitimate domain will have a single alias (or a limited number of often related aliases, e.g., with example.org being an alias for example.com). For DNS tunneling, to encode information, many such mappings may exist, often with high entropy (including suspicious or invalid domains (e.g., non existent domains)).

For NS/MX/etc., for legitimate domains, the corresponding nameservers, mail servers, etc. exist and include semantic information. For example, an NS domain should be a domain server and an MX domain should be a mail server, both of which can be validated. For DNS tunneling, to encode information, the corresponding servers will be suspicious/invalid (e.g., not provide expected services such as mail handling, and/or have high entropy names).

Finally, for TXT, for legitimate domains, the information tends to conform to certain predetermined patterns (e.g., containing strings related to DMARC, SPF, etc.). Regular expressions can be used to determine whether TXT response information is likely to be benign (corresponds to a known pattern) or evidence of DNS tunneling (does not match expected patterns). Example regular expressions for performing such matching follow (using the format: Category, Label,Comment,Regex):

Email,SenderID,,txt_text IREGEXP('.*spf2[.]0.*')
Email,SPF,"txt_text IREGEXP('.*(spf[v13.: " "=– ]|redirect=_spf[.]yandex[.]net|include:servers[.]mcsv[.] net).*')"
Email,DMARC,,txt_text IREGEXP('.* (_dmarc|p=|v=DMARC1).*')
Email,DKIM,,"txt_text IREGEXP('^.*(v[=–]dkim(1){0, 1}[;" "])|(k=rsa[;" "])|(o=[–~])|(a mx[–~]all)|(" "{0, 1}dkim=(all){0,1}).*')"
Other patterns can also be used, as applicable.

FIG. 10 illustrates various features which can be computed from DNS information. The bolded features are particularly indicative of DNS tunneling domains. Different types of responses have different formats and semantics, as described above. Different characteristics can be extracted as features (e.g., into a feature vector) for different response types.

For IPV4 responses, the following are examples of features that can be extracted:

The number of IPV4 addresses. Typically, legitimate domains will resolve to a limited number of IPV4 addresses. In contrast, if an attacker is using IPv4 to encode four bytes of information, this will result in significantly more IPv4 addresses.

The number of non-public IPv4 addresses. Typically, legitimate public domains will resolve to public IPv4 addresses. In contrast, an attacker using IPv4 to encode four bytes of information can result in use of non-public addresses (e.g., 192.168.* or 10.0.0.*).

The number of locations (e.g., cities) and autonomous systems (AS) corresponding to the IPV4 addresses. IPv4 addresses can be mapped to locations or ASes, for example, using the ip2location tool. Typically, legitimate domains will resolve to IPv4 addresses from a limited number of locations and ASes. In contrast, an attacker using IPv4 to encode four bytes of information can result in a high number of IP locations and ASes.

The average response count for all IPv4 addresses. Typically, legitimate domains will tend to have many responses for a small number of addresses. In contrast, an attacker using IPv4 to encode information will typically have only one response count for each address.

The Jeffrey distribution of response counts for all IPv4 addresses. Typically, legitimate domains will tend to have a nonzero number (e.g., IPs used many times). In contrast, malicious DNS infiltration domains will tend to have a zero number (e.g., each IP is only used a limited number of times).

The entropy of the IPV4 addresses. Typically, legitimate domains will use IP addresses in the same subnetwork (i.e. 1.2.3.0/24 and 3.4.5.8/28) and have low entropy which yields similar locations (e.g., us-central1, us-west1 etc.) and providers (e.g. Google Cloud). In contrast, an attacker using IPv4 to encode information can result in high entropy.

For IPV6 responses, the following are examples of features that can be extracted (for similar reasons to those mentioned above in connection with IPv4 responses):

The number of IPV6 addresses.

The number of non-public IPv6 addresses. Note that, non-public has different meanings in IPv4 addresses (meaning: reserved, private and internal) vs. IPv6 addresses (meaning: unassigned, reserved, private and internal). Because currently only IPv6 addresses that begin with 0xxx, 2xxx and fxxx in their hexadecimal format are "assigned," other IPv6 address values are "unassigned" (e.g., begin with 1111 and 8888).

The number of locations (e.g. cities) and ASes corresponding to the IPV6 addresses.

The average response count for all IPv6 addresses.

The Jeffrey distribution of response counts for all IPv6 addresses.

The entropy of the IPV6 addresses.

Fully qualified domain name (FQDN) responses (e.g., CNAME/NS/MX/etc.) are in the format of FQDNs and can be used to derive the features discussed above in connection with IPv4 and IPV6 responses. Additional features that are unique to FQDN responses can also be extracted, example of which follow:

The number of root domains in FQDN responses. Both DNS queries and responses are grouped using the root domain of the query as in FIGS. 6 and 8. But, responses are different in that the root domain within can be different from the one in the query. Typically, legitimate FQDN responses point to a limited set of root domains, such as the same root domain, a new domain or an alternative domain (e.g. test.example.com NS ns.example.net). In contrast, using FQDN response to encode information can have a large number of valid or invalid root domains (e.g., t1.attacker.com NS 17282938.attacker.net, t2.attacker.com NS 17282938.123.456).

Whether or not the out-of-bailiwick domains are non-existing. Typically, legitimate FQDN responses toward out-of-bailiwick (i.e., different root domains) domains will point to ones that are resolvable. In contrast, using FQDN responses to encode information is not subject to this limitation and can point to no-nexisting domains.

For TXT, responses, the following are examples of features that can be extracted:

The number of TXT responses.

The number of unknown TXT responses. Unknown TXT responses are ones not matching known patterns. Typically, legitimate domains use TXT responses for well-known use cases, such as DMARC and SPF which can be identified using known regular expressions.

The average response count for all TXT responses.

The Jeffrey distribution of response counts for all TXT responses.

The entropy of the TXT responses.

For other types of responses (e.g., SOA, KEY, DNSKEY, RRSIG), the following are examples of statistical features that can be extracted:

The number of unique responses for each response type.

The average response count for each response type.

The Jeffrey distribution of response counts for each response type.

The entropy of responses for each response type.

The above response types and values refer to rrtype and rdata. In addition to rrtype and rdata, qname and rrname are in the format of FQDNs and can be used to derive the same set of features as discussed above in connection with IPv4 response features.

Once the various features are collected (e.g., using feature extractors 808 implemented, for example, using python code and modules), they're provided to a detection engine 812 that makes use of a set of machine learning and/or heuristic detectors. These detectors work similarly to those discussed in conjunction with FIG. 6, but use infiltration-related features instead of exfiltration-related features. Machine learning detectors predict whether a domain is used for infiltration based on the extracted features.

FIG. 11 illustrates examples of detection rules that can be used in connection with various of the features described herein (e.g., by one or more heuristic detectors). Specific values for particular example detection rules are represented in FIG. 11 as variables, as the values can be customized. As one example, if the number of unique IP locations is larger than a threshold (e.g., $val2 which could, for example, be set to "30"), it can be considered an infiltration domain. Once identified, a variety of actions can be taken, e.g., instructing, by security platform 140, data appliances such as data appliance 102, to block the identified DNS tunneling domain, quarantining any client devices (e.g., by data appliance 102) from network 110 observed to attempt to contact the identified domain, alerting an administrator (e.g., of network 110) that a client has attempted to connect to such a domain, etc.

Figure 12:
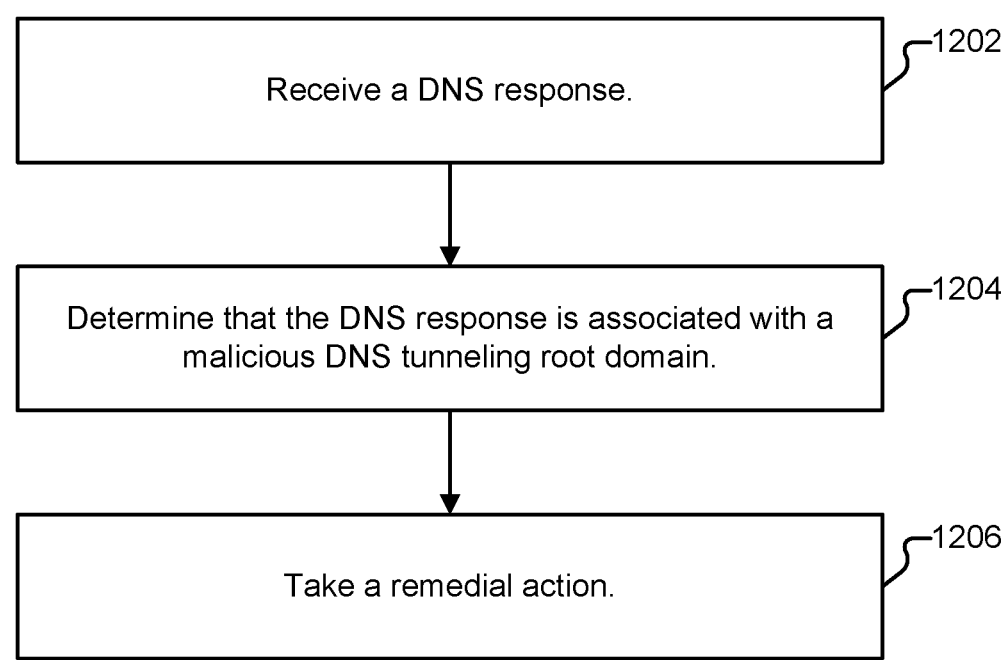
FIG. 12 illustrates an example of a process for detecting malicious DNS tunneling activity.

FIG. 12 illustrates an example of a process for detecting malicious DNS tunneling activity. In various embodiments, process 1200 is performed by security platform 140. Process 1200 can also be performed by other types of platforms/devices, as applicable, such as data appliance 102, client device 104, etc. Process 1200 begins at 1202 when a DNS response is received. As one example, a DNS response 802 is received at 1202 by an embodiment of frontend 142 from data appliance 102 (e.g., monitoring DNS traffic whether actively or passively between client device 104 and a DNS server). In some embodiments, DNS module 134 provides all DNS responses to platform 140 for analysis. DNS module 134 can also more selectively provide such requests to platform 140. One example reason DNS module 134 might not query platform 140 for a domain is where information associated with the domain is cached in data appliance 102 (e.g., because client device 106 previously requested resolution of the domain and process 1200 was previously performed with respect to the domain). Another example reason is that the domain is on a whitelist/blocklist/etc., and so additional processing is not needed.

At 1204, a determination is made that the DNS response is associated with a malicious DNS tunneling domain. As described above, an example tool for making such a determination is shown in FIG. 8 (e.g., applying heuristics and/or machine learning analysis to features extracted from the response).

Finally, at 1206, one or more appropriate remedial actions are taken. Examples of such actions include platform 140 instructing data appliance 102 to block further communication with the implicated domain, informing data appliance 102 that the domain is a malicious tunneling domain (but allowing data appliance 102 to make its own determination of what to do as a result, such as alerting an administrator that a given client has attempted to contact a malicious DNS tunneling server and quarantining the client device from other nodes on the network), extracting IP address and/or regular expression pattern information from the implicated DNS query, etc., and/or providing that information to other data appliances (e.g., as part of a subscription).

Of note, in some cases, only a single observation of a DNS response need be made to identify a malicious infiltration domain. As an example, an IPV6 response for a non-public domain can be treated as a trigger that should result in immediate blocking (or other remedial actions) being taken against the domain. For other heuristics, weights (or other approaches) can be used to determine whether a response (or set of responses) is suspicious. Both scenarios readily support real-time detection of infiltration domains.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
      receive a DNS response associated with a DNS query sent by a client device;
      detect an attempted DNS infiltration of information from a remote server to the client device based at least in part on an automated analysis of the DNS response, including by using a set of infiltration-specific detectors which use infiltration-specific features, including one or more response-specific entropy features, to determine whether the DNS response is likely to encode the information; and in response to the detection, perform a remedial action; and a memory coupled to the processor and configured to provide the processor with instructions.

2. The system of claim 1, wherein the DNS response is received, at a server on an external network, from a security appliance collocated with the client device.

3. The system of claim 1, wherein the processor is configured to perform the detection using at least one model trained on DNS response feature information.

4. The system of claim 1, wherein the processor is configured to perform the detection using a set of heuristics.

5. The system of claim 1, wherein performing the remedial action includes including a domain associated with the DNS response in a blocklist.

6. The system of claim 1, wherein performing the remedial action includes providing a result of the analysis to a security appliance during a session of the client device.

7. The system of claim 1, wherein the remote server is a malicious DNS server and wherein performing the remedial action includes preventing the client device from communicating with the malicious DNS server.

8. The system of claim 1, wherein the processor is configured to perform the analysis based at least in part on a feature vector that maintains information for a sliding time window of DNS information.

9. The system of claim 8, wherein a feature included in the feature vector represents a number of distinct fully qualified domain names associated with a root domain portion.

10. The system of claim 1, wherein the analysis includes determining a correlation between a plurality of IP addresses associated with a domain.

11. The system of claim 1, wherein the analysis includes determining a location of a domain.

12. The system of claim 1, wherein the analysis includes determining entropy of a set of unique IP addresses.

13. The system of claim 1, wherein the analysis includes determining whether the DNS response includes a non-public IPv6 address.

14. The system of claim 1, wherein the analysis includes determining whether data in a TXT response matches a pattern.

15. The system of claim 1, wherein the analysis includes determining a count of unknown TXT responses.

16. The system of claim 1, wherein the analysis includes determining an entropy of a set of unique TXT responses.

17. The system of claim 1, wherein the analysis includes determining a meaningful word ratio.

18. The system of claim 1, wherein the analysis includes determining a subdomain Jeffrey distribution.

19. A method, comprising:

receiving a DNS response associated with a DNS query sent by a client device;

detecting an attempted DNS infiltration of information from a remote server to the client device based at least in part on an automated analysis of the DNS response, including by using a set of infiltration-specific detectors which use infiltration-specific features, including one or more response-specific entropy features, to determine whether the DNS response is likely to encode the information; and in response to the detection, performing a remedial action.

20. A computer program product embodied in a non-transitory computer readable medium and comprising computer instructions for:

receiving a DNS response associated with a DNS query sent by a client device;

detecting an attempted DNS infiltration of information from a remote server to the client device based at least in part on an automated analysis of the DNS response, including by using a set of infiltration-specific detectors which use infiltration-specific features, including one or more response-specific entropy features, to determine whether the DNS response is likely to encode the information; and in response to the detection, performing a remedial action.

* * * * *